(12) United States Patent
Mamtimin et al.

(10) Patent No.: US 12,228,031 B2
(45) Date of Patent: Feb. 18, 2025

(54) DEEP LEARNING HOLDUP SOLUTION FROM NEUTRON CAPTURE AND INELASTIC SCATTERING

(71) Applicant: Halliburton Energy Services, Inc., Houston, TX (US)

(72) Inventors: Mayir Mamtimin, Spring, TX (US); Jeffrey James Crawford, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 848 days.

(21) Appl. No.: 17/412,078

(22) Filed: Aug. 25, 2021

(65) Prior Publication Data

US 2023/0060188 A1 Mar. 2, 2023

(51) Int. Cl.
| | |
|---|---|
| *G01V 5/10* | (2006.01) |
| *E21B 47/00* | (2012.01) |
| *E21B 49/00* | (2006.01) |
| *G06N 3/045* | (2023.01) |

(52) U.S. Cl.
CPC .............. *E21B 49/00* (2013.01); *E21B 47/00* (2013.01); *G01V 5/102* (2013.01); *G06N 3/045* (2023.01)

(58) Field of Classification Search
CPC .......... E21B 49/00; E21B 47/00; E21B 47/10; G01V 5/102; G01V 5/101; G06N 3/045; G06N 3/0464
See application file for complete search history.

(56) References Cited

U.S. PATENT DOCUMENTS

| | | | |
|---|---|---|---|
| 2007/0108380 A1 | 5/2007 | Poe et al. | |
| 2010/0193676 A1 | 8/2010 | Jacobson et al. | |
| 2011/0282818 A1 | 11/2011 | Chen et al. | |
| 2014/0343857 A1* | 11/2014 | Pfutzner | G01V 5/102 702/8 |
| 2016/0003969 A1* | 1/2016 | Zhou | G01V 5/101 250/269.6 |
| 2019/0242232 A1 | 8/2019 | Han et al. | |
| 2019/0383962 A1 | 12/2019 | Zhou et al. | |

OTHER PUBLICATIONS

International Search Report and Written Opinion for Application No. PCT/US2021/049500, dated May 16, 2022.

\* cited by examiner

*Primary Examiner* — Kiho Kim
(74) *Attorney, Agent, or Firm* — John Wustenberg; C. Tumey Law Group PLLC (57) ABSTRACT

Systems and methods of the present disclosure relate to determining a borehole holdup. A method comprises logging a well with a pulsed-neutron logging (PNL) tool; receiving, via the PNL tool, transient decay measurements, capture spectrum measurements, and inelastic spectrum measurements; extracting information from each of the capture spectrum measurements, the inelastic spectrum measurements, and the transient decay measurements; inputting all of the extracted information as a single input into artificial neural networks; and determining the borehole holdup with the artificial neural networks.

20 Claims, 7 Drawing Sheets

DEEP LEARNING HOLDUP SOLUTION FROM NEUTRON CAPTURE AND INELASTIC SCATTERING

BACKGROUND

In petrophysical applications, borehole holdup may refer to volumetric ratios of oil, water, and gas in a borehole. When a pulsed-neutron logging (PNL) tool is used to determine the borehole holdup, nuclear detectors may measure induced gammas by interaction of high energy neutrons that are emitted from a generator. Induced gamma measurements may include inelastic spectrum and capture spectrum. Accurate knowledge of the borehole holdup content may directly determine accuracy of oil saturation in a formation. Additionally, in horizontal production wells it may be important to accurately measure the borehole holdup to determine the flow. Traditional PNL holdup measurement may mainly rely on an inelastic interaction of fast neutrons with low-Z atomic nuclei. Including neutron capture measurements may be troublesome due to nonlinear correlations and different depth of investigations.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to techniques for artificial neural network algorithms that use both inelastic physics and capture physics correlations in calculation of the borehole holdup. Some non-limiting examples of artificial neural networks may include deep learning networks, convolutional neural networks, decision tree networks, and/or recurrent networks.

In particular examples, a gamma spectrum may be converted to a digital feature map that may be analyzed by deep learning and convolutional neural networks. An inelastic spectrum may offer direct correlations of carbon and oxygen, while capture spectrum may offer complementary information providing borehole and formation elemental content, resulting in a two-component (oil and water) or a three-component (oil, water, and gas) holdup measurement solution. In particular examples, tool design and algorithm(s) may be carefully integrated to correlate detector responses to: (1) gamma spectrum; (2) characterization of borehole variations; (3) compensate effects from formation; and (4) integrated holdup answer.

The gamma spectrum may include inelastic and capture spectrum. Multiple detectors and a corroborative feature map may be utilized. Additionally, physics-guided feature-engineering as well as implementation of deep learning and convolutional neural networks algorithms may also occur.

Characterization of borehole variations may include hole size (e.g., open hole or cased hole); casing size; and tool standoff. Also, compensation for formation characteristics may include compensating for porosity, saturation, and/or lithology. The integrated holdup answer may include two-phase holdup (e.g., oil and water) or three-phase holdup (e.g., oil, water, and gas).

Compared to current holdup methodologies, the techniques described herein advance deep learning and convolutional neural networks capabilities and offer superior measurement by combining inelastic spectrum; capture spectrum; and transient decay curve. The addition of capture physics adds unique information to the computation, reducing uncertainty, and improving accuracy. Inelastic and capture data may arise from different mechanisms. Therefore, the inelastic and capture data are two different means of supporting a single answer product, providing stand-alone indications of holdup. Additionally, their relative behavior may also serve as a valuable feature.

Figure 1:
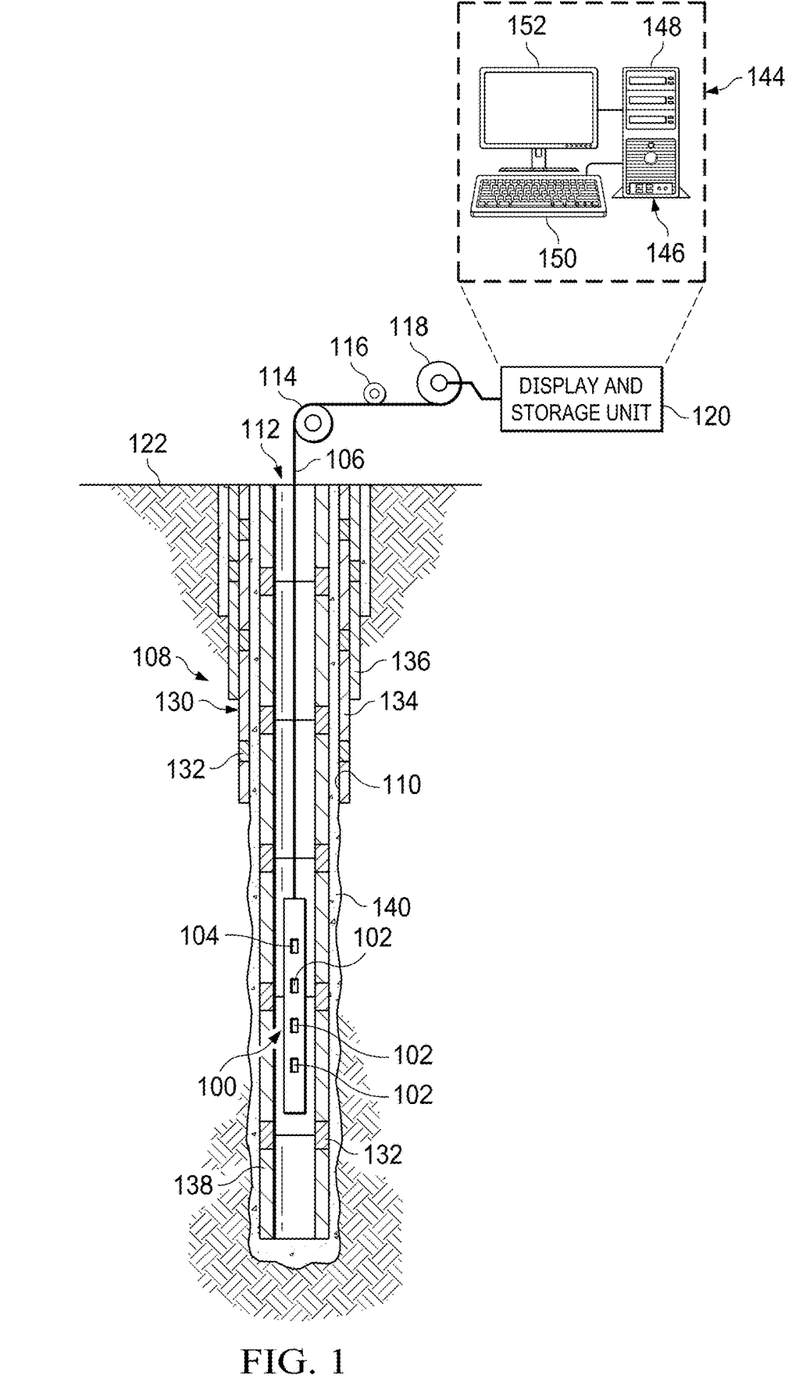
FIG. 1 illustrates an PNL tool in a wireline configuration, in accordance with examples of the present disclosure.

FIG. 1 illustrates an operating environment for a PNL tool 100, in accordance with examples of the present disclosure. In some examples, the PNL tool 100 may include gamma detectors 102 and a neutron source 104. The PNL tool 100 is a non-limiting example and other suitable PNL tools may be utilized, as should be understood by one having skill in the art, with the benefit of this disclosure. It should be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, the PNL tool 100 may be operatively coupled to a conveyance 106 (e.g., wireline, slickline, coiled tubing, pipe, downhole tractor, and/or the like) which may provide mechanical suspension, as well as electrical connectivity, for the PNL tool 100. It should be understood that the configuration of PNL tool 100 shown on FIG. 1 is merely illustrative and other configurations of the PNL tool 100 may be used with the present techniques.

A conveyance 106 and the PNL tool 100 may extend within a casing string 108 to a desired depth within the wellbore 110. The conveyance 106, which may include one or more electrical conductors, may exit a wellhead 112, may pass around a pulley 114, may engage an odometer 116, and may be reeled onto a winch 118, which may be employed to raise and lower the PNL tool 100 in the wellbore 110. Signals recorded by the PNL tool 100 may be stored on memory and then processed by a display and storage unit 120 after recovery of the PNL tool 100 from the wellbore 110. Alternatively, signals recorded by the PNL tool 100 may be transmitted to the display and storage unit 120 by way of the conveyance 106. The display and storage unit 120 may process the signals, and the information contained therein may be displayed for an operator to observe and store for future processing and reference. Alternatively, the signals may be processed downhole prior to receipt by display and storage unit 120 or both downhole and at a surface 122, for example. The display and storage unit 120 may also contain an apparatus for supplying control signals and power to the PNL tool 100. The casing string 108 may extend from the wellhead 112 at or above ground level to a selected depth within the wellbore 110. The casing string 108 may comprise a plurality of joints 130 or segments of the casing string 108, each joint 130 being connected to the adjacent segments by a collar 132. There may be any number of layers in the casing string 108. For example, the layers may include a first casing 134 and a second casing 136.

FIG. 1 also illustrates a pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. The PNL tool 100 may be dimensioned so that it may be lowered into the wellbore 110 through the pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between the first casing 134 and the second casing 136.

In logging systems utilizing the PNL tool 100, a digital telemetry system may be employed, wherein an electrical circuit may be used to both supply power to the PNL tool 100 and to transfer data between the display and storage unit 120 and the PNL tool 100. A DC voltage may be provided to the PNL tool 100 by a power supply located above ground level, and data may be coupled to the DC power conductor by a baseband current pulse system. Alternatively, the PNL tool 100 may be powered by batteries located within the downhole tool assembly, and/or the data provided by the PNL tool 100 may be stored within the downhole tool assembly, rather than transmitted to the surface during logging.

In certain examples, operation and function of the PNL tool 100 may be controlled at the surface 122 by a computer 144. As illustrated, the computer 144 may be a component of the display and storage unit 120. The computer 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the computer 144 may be a personal computer, a network storage device, or any other suitable device and may vary in size, shape, performance, functionality, and price. The computer 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. The non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. At the surface 122, the computer 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with the PNL tool 100 and/or software executed by processing unit 146. For example, the computer 144 may enable an operator to select analysis options, view collected log data, view analysis results, and/or perform other tasks.

Figure 2:
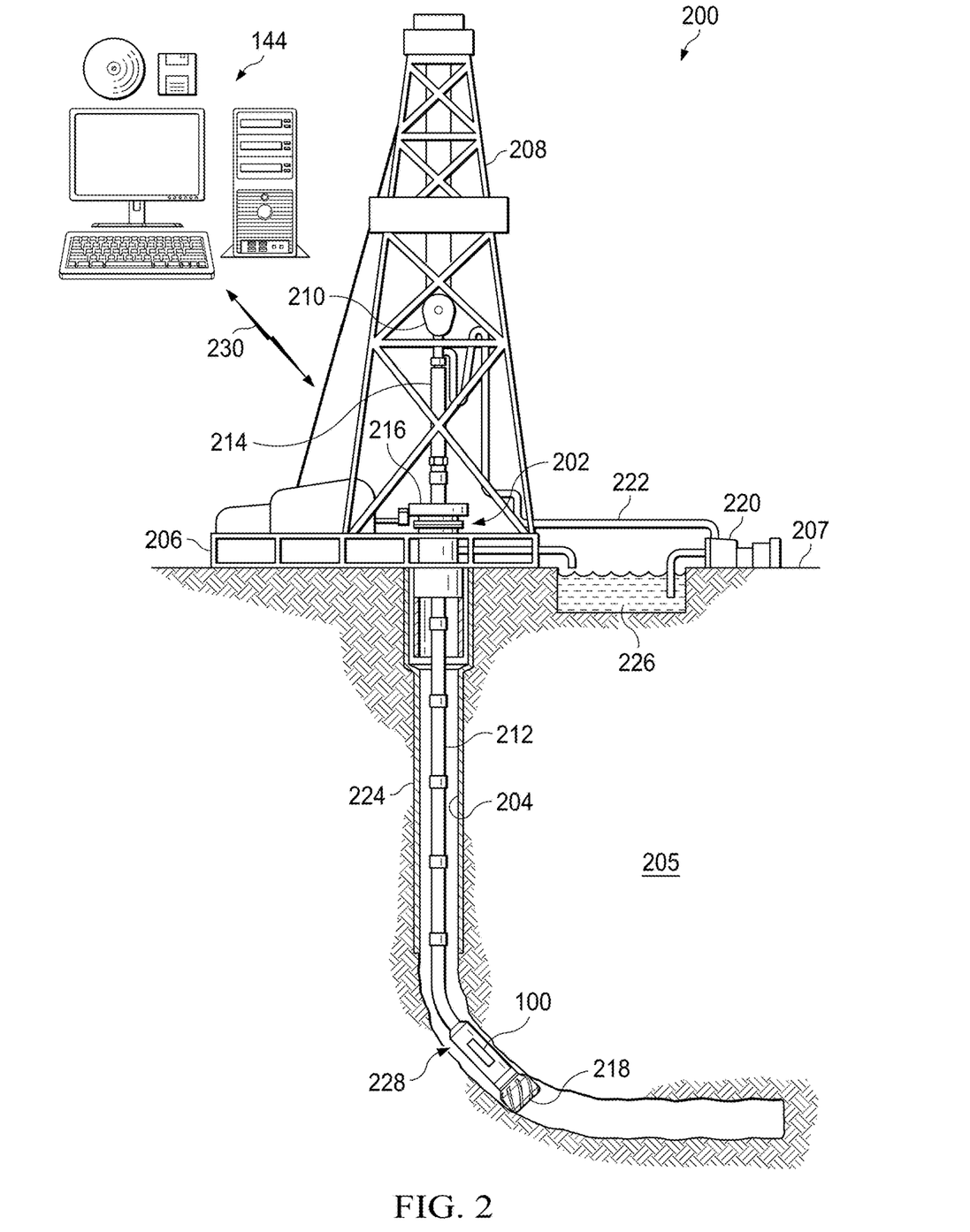
FIG. 2 illustrates an PNL tool in a drilling configuration, in accordance with examples of the present disclosure.

FIG. 2 illustrates an example of the PNL tool 100 included in a drilling system 200, in accordance with examples of the present disclosure. It should be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a borehole 204 may extend from a wellhead 202 into a subterranean formation 205 from a surface 207. The borehole 204 may include horizontal, vertical, slanted, curved, and other types of borehole geometries and orientations. A drilling platform 206 may support a derrick 208 having a traveling block 210 for raising and lowering a drill string 212. The drill string 212 may include, but is not limited to, drill pipe and coiled tubing, as generally known to those skilled in the art. A top drive or kelly 214 may support the drill string 212 as it may be lowered through a rotary table 216.

A drill bit 218 may be attached to the distal end of drill string 212 and may be driven either by a downhole motor and/or via rotation of drill string 212 from the surface 207. Without limitation, the drill bit 218 may include roller cone bits, PDC bits, natural diamond bits, any hole openers, reamers, coring bits, and the like. As the drill bit 218 rotates, it may create and extend borehole 204 that penetrates the subterranean formation 205. A pump 220 may circulate drilling fluid through a feed pipe 222 to the kelly 214, downhole through the interior of the drill string 212, through orifices in the drill bit 218, back to the surface 207 via an annulus 224 surrounding the drill string 212, and into a retention pit 226.

The drill string 212 may begin at wellhead 202 and may traverse borehole 204. The drill bit 218 may be attached to a distal end of the drill string 212 and may be driven, for example, either by a downhole motor and/or via rotation of the drill string 212 from the surface 207. The drill bit 218 may be a part of a bottom hole assembly 228 at a distal end of the drill string 212. The bottom hole assembly 228 may include the PNL tool 100 via threaded connections, for example. As will be appreciated by those of ordinary skill in the art, bottom hole assembly 228 may be a measurement-while drilling (MWD) or logging-while-drilling (LWD) system.

Without limitation, the PNL tool 100 may be connected to and/or controlled by the computer 144. Processing of information recorded may occur downhole and/or at the surface 207. Data being processed downhole may be transmitted to the surface 207 to be recorded, observed, and/or further analyzed. Additionally, the data may be stored in memory of the PNL tool 100 while the PNL tool 100 is disposed downhole.

In some examples, wireless communication may be used to transmit information back and forth between the computer 144 and the PNL tool 100. The computer 144 may transmit information to the PNL tool 100 and may receive, as well as process information recorded by the PNL tool 100. In examples, while not illustrated, the bottom hole assembly 228 may include one or more additional components, such as an analog-to-digital converter, filter and amplifier, among others, that may be used to process the measurements of the PNL tool 100 before they may be transmitted to the surface 207. Alternatively, raw measurements may be transmitted to the surface 207 from the PNL tool 100.

Any suitable technique may be used for transmitting signals from the PNL tool 100 to the surface 207, including, but not limited to, wired pipe telemetry, mud-pulse telemetry, acoustic telemetry, and electromagnetic telemetry. While not illustrated, the bottom hole assembly 228 may include a telemetry subassembly that may transmit telemetry data to the surface 207. Without limitation, an electromagnetic source in the telemetry subassembly may be operable to generate pressure pulses in the drilling fluid that propagate along the fluid stream to the surface 207. At the surface 207, pressure transducers (not shown) may convert the pressure signal into electrical signals for a digitizer (not illustrated). The digitizer may supply a digital form of the telemetry signals to the computer 144 via a communication link 230, which may be a wired or wireless link. The telemetry data may be analyzed and processed by the computer 144.

Figure 3:
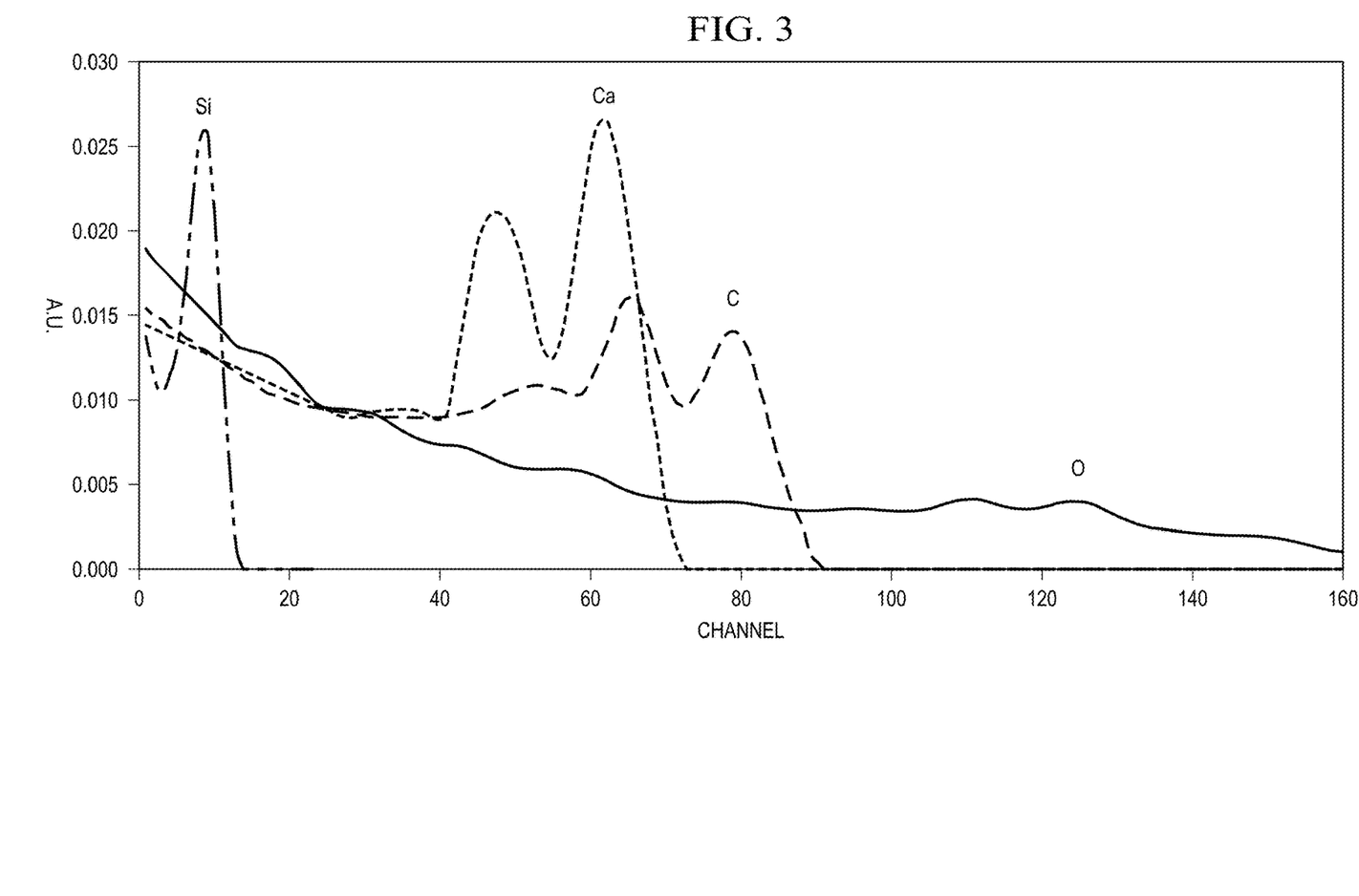
FIG. 3 illustrates an elemental inelastic spectrum raw data acquired with the PNL tool in a first mode of measurement, in accordance with examples of the present disclosure.

FIG. 3 illustrates an elemental inelastic spectrum raw data acquired with the PNL tool in a first mode of measurement and processed with a computer, in accordance with some examples of the present disclosure. Determining borehole holdup may require a detailed correlation map because nuclear spectral measurement is affected by borehole, casing, and formation. Neutron inelastic interaction may offer a measurement of elemental concentration of the surrounding material. In the inelastic gamma spectrum, each energy channel may contain data to reconstruct the borehole environment from the measured spectrum. While elements like carbon (C), oxygen (O), calcium (Ca), and silicon (Si) may indicate general elemental composition, overall spectral shape may indicate bulk matrix and density of the surrounding material. This is because the overall spectral shape or the slope may be determined by the likelihood of the inelastic scattering (or capture) event by the nucleus, the amount of gamma attenuation, and detector efficiency. Thus, a bulk density index may be extracted when scattering cross-section and detector efficiencies are known.

Characteristic gamma peaks may provide only partial information. Overall spectral shape and slope may contain hidden features that may be extracted and correlated to the holdup. The hidden features may include characteristic gamma peaks, ratios or algebraic expressions of ratios, entire spectrum or spectral vector, decay spectrum or decay constant, differential attenuation or electron density index, or combinations thereof.

Tool position with respect to borehole and formation geometry may be another factor that affects measurement. In particular examples, auxiliary data such as borehole size, casing size, tool standoff, and formation variations including formation lithology, porosity, and saturation may be used to determine holdup. In some examples, formation effects may be isolated and compensated to deliver accurate holdup measurements. In the deep learning and convolutional neural networks framework(s), formation effects are treated as physical features that are isolated and correlated to the holdup answer. For example, spectral image and decay curves from multiple detectors may be used to generate a map of formation elemental composition and a density index.

Figure 4:
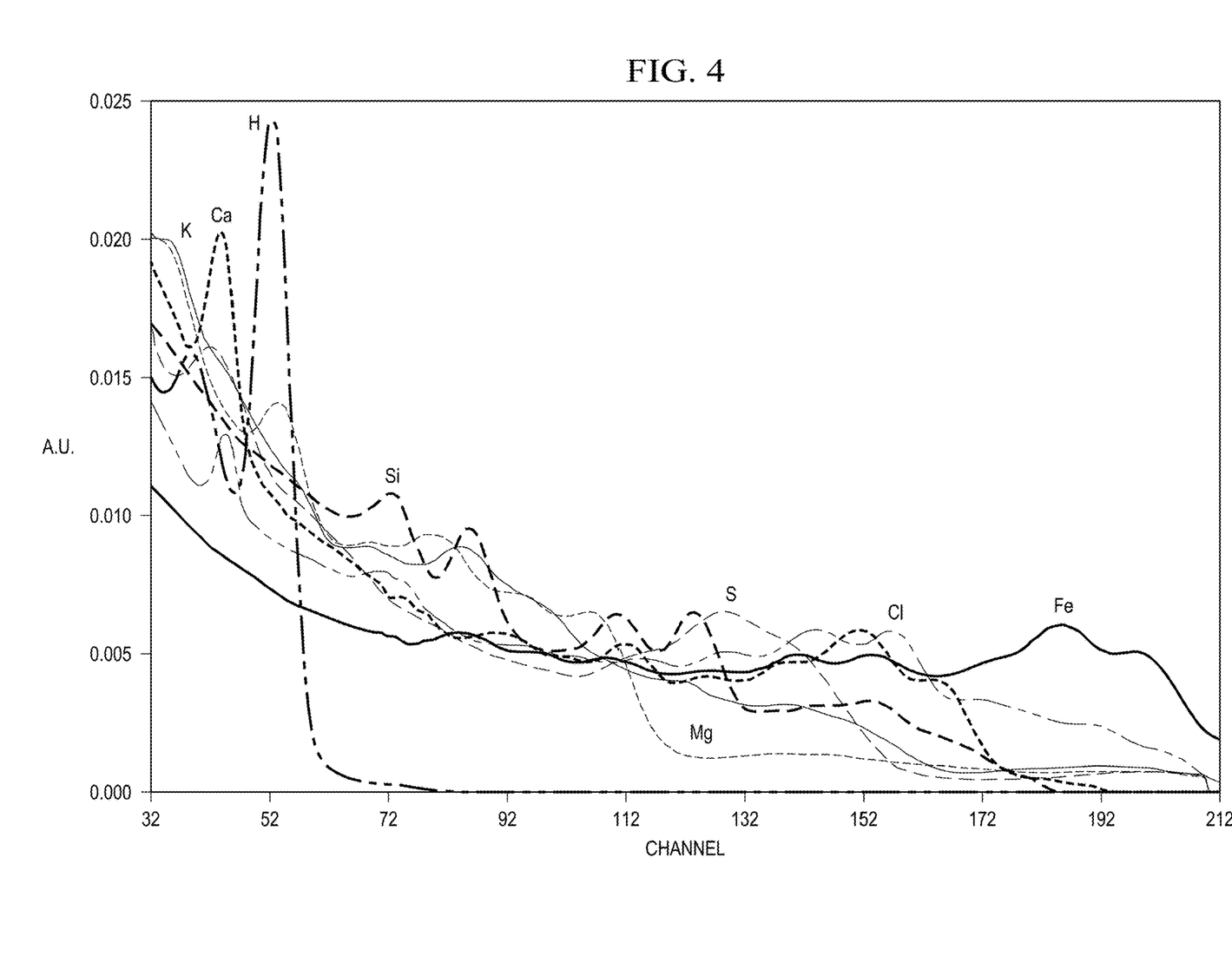
FIG. 4 illustrates thermal neutron capture raw data acquired with the PNL tool in a second mode of measurement, in accordance with examples of the present disclosure.

FIG. 4 illustrates thermal neutron capture raw data acquired with the PNL tool in a second mode of measurement and processed with a computer, in accordance with some examples of the present disclosure. Thermal neutron capture may reveal elemental composition in the sampling volume. Elements such as hydrogen (H), Ca, potassium (K), Si, magnesium (Mg), sulfur (S), chloride (Cl), and iron (Fe) may have a pronounced gamma response to the measurement. In some examples, depending on an application of the analysis, a spectrum may be normalized, and background subtracted and reshaped to include derived features. Background subtraction may include: binning by energy and detector resolution; normalization by detector efficiency; normalization by Compton continuum; reshape by mathematical models; derived/constructed new features based on physics and application.

Figure 5:
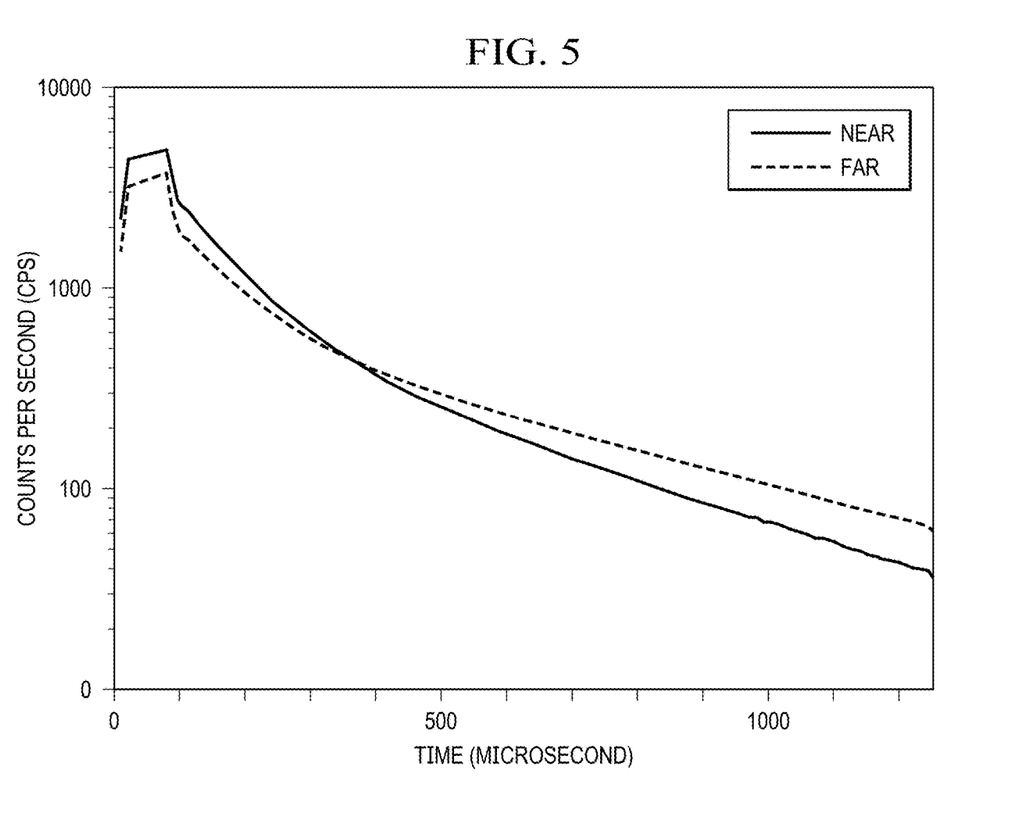
FIG. 5 illustrates neutron transient decay raw data acquired with the PNL tool in a third mode of measurement, in accordance with examples of the present disclosure.

FIG. 5 illustrates neutron transient decay raw data acquired with the PNL tool in a third mode of measurement and processed with a computer, in accordance with some examples of the present disclosure. Neutron intensity at a given point may drop as a function of time due to thermalization and absorption of neutrons. A transient time constant may depend on elemental concentrations of neutron moderating and absorbing materials. Hydrogen may be an effective moderating medium while chlorine may have a high capture cross section. Therefore, a transient decay curve may offer essential information about sampling volume when interrogated with timely-structured neutron bursts. As illustrated in FIG. 5, the neutron transient decay curve may be different for near and far detectors that are placed close and far from the neutron source, respectively.

Figure 6:
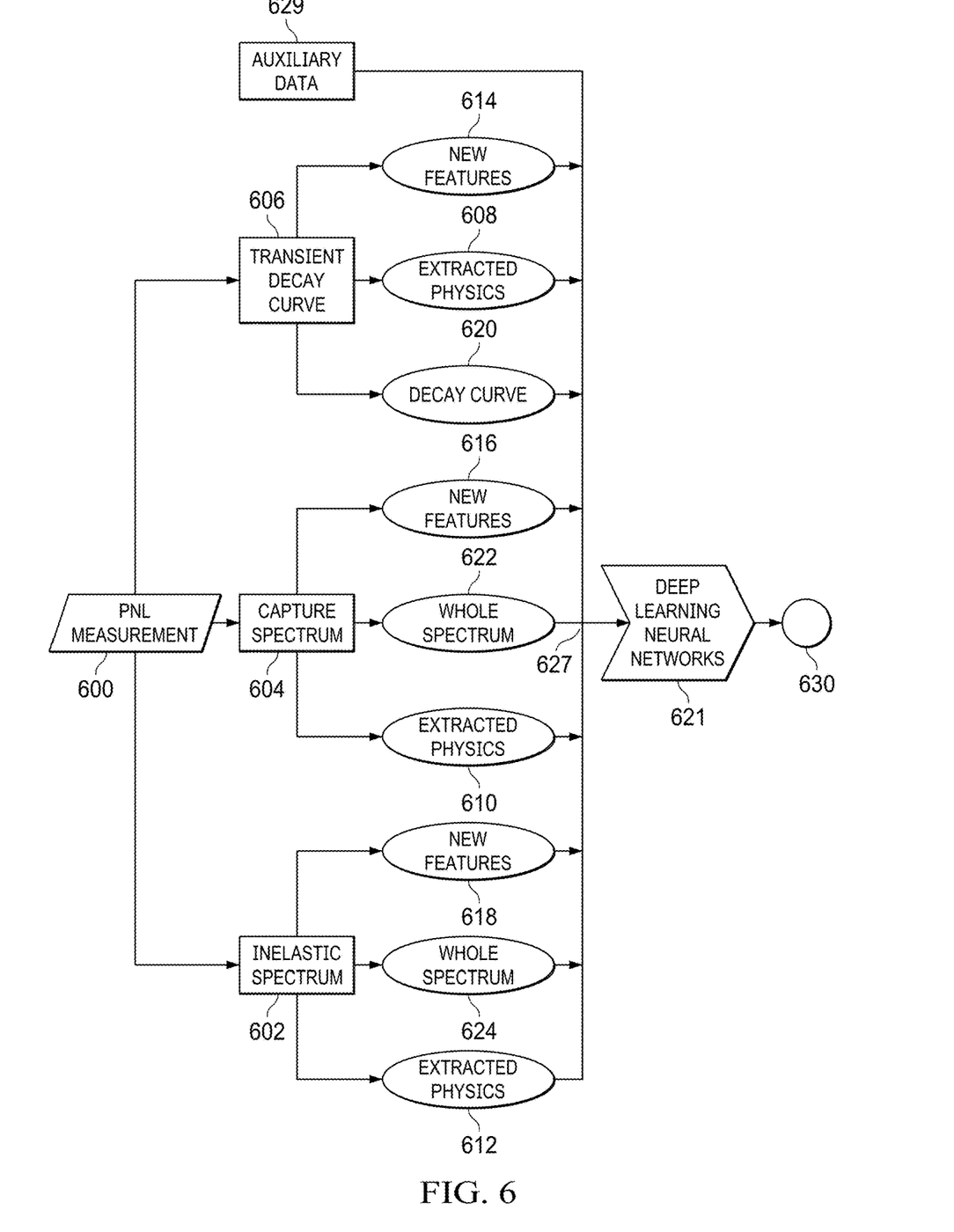
FIG. 6 illustrates an exemplary flow chart that combines data acquired with all three modes of measurement to construct an artificial neural network algorithm to provide borehole holdup, in accordance with examples of the present disclosure.

FIG. 6 illustrates an exemplary flow chart that combines data acquired with all three modes of measurement to construct a deep learning and convolutional neural networks algorithm(s) to fully correlate the PNL measurements for determining the borehole holdup, in accordance with examples of the present disclosure. For example, PNL measurements may be acquired at step 600 via a PNL tool (e.g., the PNL tool 100 shown on FIGS. 1 and 2). The PNL measurements may include elemental inelastic spectrum measurements shown at step 602, thermal neutron capture measurements shown at step 604, and transient decay measurements shown at step 606. In some examples, new features, physics-related parameters, and measured vectors, all of which may be based on the elemental inelastic spectrum measurements (e.g., shown on FIG. 3), the thermal neutron capture measurements (e.g., shown on FIG. 4), and the transient decay measurements (e.g., shown on FIG. 5), may be used as inputs for deep learning and convolutional neural networks.

For example, at step 608, physics-related parameters/information may be extracted from the transient decay curve (e.g., see FIG. 5). The physics-related parameters extracted may include time constants that may be extracted. A physical parameter may be extracted by an intermediate algorithm that correlates decay curve to the petrophysical properties. For example, a time-decay-curve may provide hydrogen concentration in the near-field and far-field with respect to the tool location. Hydrogen concentration may be the extracted physical feature that may be used as an input for the deep learning and convolutional neural networks along with the decay curve itself.

At step 610, physics-related parameters may be extracted from the capture spectrum (e.g., see FIG. 4). The physics-related parameters extracted may include elemental yield, for example, for the elements shown on FIG. 4. The physics-related parameters may be extracted as previously described. However, a different physical feature may be extracted. Capture spectrum may help extract elemental mapping of the borehole matrix. Such as, for example, H, Fe, Cl, etc.

At step 612, physics-related parameters may be extracted from the elemental inelastic spectrum (e.g., see FIG. 3). The physics-related parameters extracted may include elemental gamma ratios for example, for the elements shown on FIG. 3. Low Z elemental concentrations may be extracted from inelastic spectrum.

At step 614, new features/information may be derived/constructed to include indirect physical parameters based on analytical formulation of the decay curve. Non-limiting examples of the indirect physical parameters for the decay curve may include the slope of the curve itself. The slope of the curve may be a time-constant. This constant may be based on an analytical formula of the neutron transient analysis.

At step 616, new features may be derived/constructed to include indirect physical parameters based on analytical formulation of the capture spectrum. Non-limiting examples of the indirect physical parameters for the capture spectrum may include the parameters as discussed above. At step 618, new features may be derived/constructed to include indirect physical parameters based on analytical formulation of the inelastic spectrum. Non-limiting examples of the indirect physical parameters for the inelastic spectrum may include the parameters as discussed above.

At step 620, the decay curve may be used as an input for the deep learning and convolutional neural networks 621. Non-limiting examples of the deep learning and convolutional neural networks 621 may include multilayer perceptron and linear/nonlinear regression networks. In some examples, the decay curve that may be used as raw data may be reduced in dimensions.

At step 622, information such as an entire measured vector (e.g., a whole spectrum) from the capture spectrum may be used as an input for the deep learning and convolutional neural networks 621. Additionally, the entire measured vector from the capture spectrum that may be used as raw data may be reduced in dimensions, in some examples. At step 624, an entire measured vector (e.g., a whole spectrum) from the inelastic spectrum may be used as an input for the deep learning and convolutional neural networks 621. Additionally, the entire measured vector from the inelastic spectrum that may be used as raw data may be reduced in dimensions, in some examples. At step 626, auxiliary data such as borehole size, casing size, tool standoff, and formation variations including formation lithology, porosity, and saturation may be inputted into the deep learning and convolutional neural networks 621.

Figure 7:
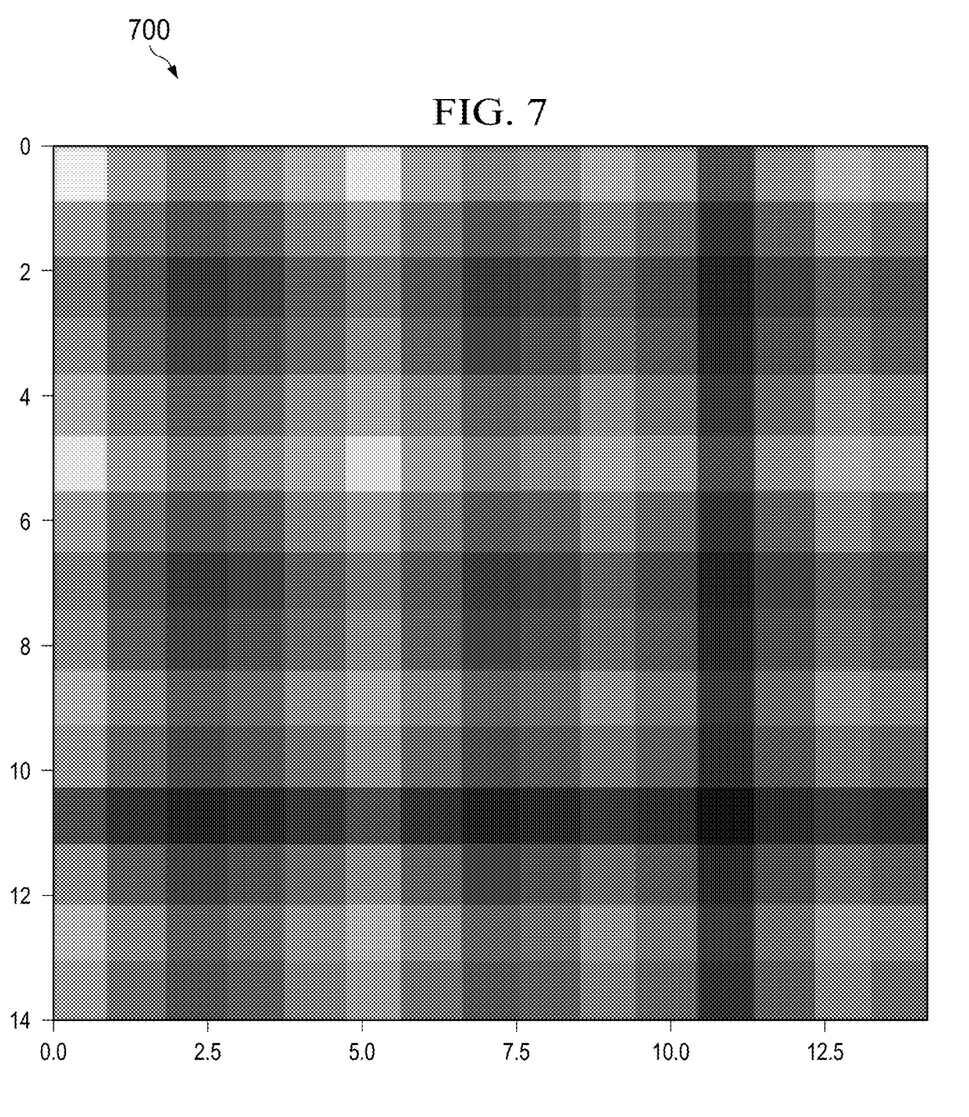
FIG. 7 illustrates a spectral image for use as an input for artificial neural networks, in accordance with examples of the present disclosure.

In some examples, transient curve data and gamma spectrum data may be converted to a single spectral image to form a single input node 627, as shown on FIG. 7, for example. In some examples, auxiliary data 629 may also be converted with the transient curve(s) and gamma spectrum to a spectral image to form the single input node 627. Auxiliary data may be used as-is, or may be meshed with all other measurement. Example of meshing may include simple multiplication, division, etc.

Both regression and classification algorithms may be used to create an output from the neural networks to form a holdup answer product. Finally, borehole holdup 630 may be used as the answer/output for deep learning and convolutional neural networks model training. All extracted features may be used as an input for the model training. Deep learning and convolutional neural networks model(s) may be trained using supervised learning from known holdup data points. For example, the model(s) receives all of the input data and trains with known 2-phase or 3-phase holdup as the answer.

FIG. 7 illustrates a spectral image 700 for use as an input for deep learning and convolutional neural networks, in accordance with examples of the present disclosure. The spectral image 700 may include a measured gamma spectrum with 256 channels. The gamma spectrum may have background signals subtracted and then the gamma spectrum may be normalized. The gamma spectrum then may be converted to a spectral image or reduced in dimension by energy bins. This new vector may be expanded with derived or new features. Finally, the vector may be pixelated to construct the spectral image 700 to be used as an input for deep learning and convolutional neural networks. The axes are unitless, as they illustrate the pixel location.

Accordingly, the systems and methods of the present disclosure allow for the processing of PNL signals in a downhole environment to create an output from neural networks to form a holdup answer product based on inelastic spectrum, capture spectrum, and a transient decay curve. The systems and methods may include any of the various features disclosed herein, including one or more of the following statements.

Statement 1. A method for determining a borehole holdup, the method comprising: logging a well with a pulsed-neutron logging (PNL) tool; receiving, via the PNL tool, transient decay measurements, capture spectrum measurements, and inelastic spectrum measurements; extracting information from each of the capture spectrum measurements, the inelastic spectrum measurements, and the transient decay measurements; inputting all of the extracted information as a single input into artificial neural networks; and determining the borehole holdup with the artificial neural networks.

Statement 2. The method of the statement 1, wherein the extracting information from the transient decay measurements comprises extracting new features, physics, and decay data.

Statement 3. The method of the statement 1 or the statement 2, wherein the extracting information from each of the capture spectrum measurements and the inelastic spectrum measurements comprises extracting new features, physics, and an entire spectrum.

Statement 4. The method of any one of the statements 1-3, further comprising inputting auxiliary data into the into artificial neural networks.

Statement 5. The method of any one of the statements 1-4, wherein the inputting the auxiliary data comprises inputting borehole size, casing size, tool standoff, and/or formation variations.

Statement 6. The method of any one of the statements 1-5, wherein the extracting new features comprises extracting indirect physical parameters.

Statement 7. The method of any one of the statements 1-6, wherein the extracting information from the transient decay measurements comprises extracting a time constant.

Statement 8. The method of any one of the statements 1-7, wherein the inputting all of the extracted information as a single input comprises inputting all of the extracted information as a single spectral image.

Statement 9. The method of any one of the statements 1-8, further comprising extracting elemental yield from the capture spectrum measurements.

Statement 10. The method of any one of the statements 1-9, further comprising extracting elemental gamma ratios from the inelastic spectrum measurements.

Statement 11. A system for determining a borehole holdup, the system comprising: a pulsed-neutron logging (PNL) tool operable to measure capture spectrum, inelastic spectrum, and transient decay; and a computer operable to: extract information from each of capture spectrum measurements, inelastic spectrum measurements, and transient decay measurements; input all extracted information as a single input into artificial neural networks; and determine the borehole holdup with the artificial neural networks.

Statement 12. The system of the statement 11, wherein the computer is further operable to extract new features, physics, and decay data from the transient decay measurements.

Statement 13. The system of the statement 11 or the statement 12, wherein the computer is further operable to extract new features, physics, and an entire spectrum from each of the capture spectrum measurements and the inelastic spectrum measurements.

Statement 14. The system of any one of the statements 11-13, wherein the computer is further operable to extract indirect physical parameters from each of the capture spectrum measurements, inelastic spectrum measurements, and transient decay measurements.

Statement 15. The system of any one of the statements 11-14, wherein the computer is further operable to input auxiliary data into the artificial neural networks.

Statement 16. The system of any one of the statements 11-15, wherein the auxiliary data comprises borehole size, casing size, tool standoff, and/or formation variations.

Statement 17. The system of any one of the statements 11-16, wherein the computer is further operable to extract a time constant from the transient decay measurements.

Statement 18. The system of any one of the statements 11-17, wherein the computer is further operable to input all extracted information as a single spectral image into the artificial neural networks.

Statement 19. The system of any one of the statements 11-18, wherein the computer is further operable to extract elemental yield from the capture spectrum measurements.

Statement 20. The system of any one of the statements 11-19, wherein the computer is further operable to extract elemental gamma ratios from the inelastic spectrum measurements.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining a borehole holdup, the method comprising:
   logging a well with a pulsed-neutron logging (PNL) tool;
   receiving, via the PNL tool, transient decay measurements, capture spectrum measurements, and inelastic spectrum measurements;
   extracting information from each of the capture spectrum measurements, the inelastic spectrum measurements, and the transient decay measurements;
   combining at least some of the extracted information to form an input;
   inputting the input into a model; and
   determining the borehole holdup with the model.

2. The method of claim 1, wherein the extracting information from the transient decay measurements comprises extracting new features, physics, and decay data.

3. The method of claim 2, wherein the extracting information from each of the capture spectrum measurements and the inelastic spectrum measurements comprises extracting new features, physics, and an entire spectrum.

4. The method of claim 3, further comprising inputting auxiliary data into the into the artificial neural networks.

5. The method of claim 4, wherein the inputting the auxiliary data comprises inputting borehole size, casing size, tool standoff, and/or formation variations.

6. The method of claim 4, wherein the extracting new features comprises extracting indirect physical parameters.

7. The method of claim 1, wherein the extracting information from the transient decay measurements comprises extracting a time constant.

8. The method of claim 1, wherein the inputting the input comprises inputting all of the extracted information as a single spectral image.

9. The method of claim 1, further comprising extracting elemental yield from the capture spectrum measurements.

10. The method of claim 1, further comprising extracting elemental gamma ratios from the inelastic spectrum measurements.

11. A system for determining a borehole holdup, the system comprising:
 a pulsed-neutron logging (PNL) tool operable to measure capture spectrum, inelastic spectrum, and transient decay; and
 a computer operable to:
  extract information from each of capture spectrum measurements, inelastic spectrum measurements, and transient decay measurements;
  combine at least some of the extracted information to form an input;
  input the input into a model; and
  determine the borehole holdup with the artificial neural networks.

12. The system of claim 11, wherein the computer is further operable to extract new features, physics, and decay data from the transient decay measurements.

13. The system of claim 11, wherein the computer is further operable to extract new features, physics, and an entire spectrum from each of the capture spectrum measurements and the inelastic spectrum measurements.

14. The system of claim 11, wherein the computer is further operable to extract indirect physical parameters from each of the capture spectrum measurements, inelastic spectrum measurements, and transient decay measurements.

15. The system of claim 11, wherein the computer is further operable to input auxiliary data into the artificial neural networks.

16. The system of claim 15, wherein the auxiliary data comprises borehole size, casing size, tool standoff, and/or formation variations.

17. The system of claim 11, wherein the computer is further operable to extract a time constant from the transient decay measurements.

18. The system of claim 11, wherein the computer is further operable to input the input as a single spectral image into the artificial neural networks.

19. The system of claim 11, wherein the computer is further operable to extract elemental yield from the capture spectrum measurements.

20. The system of claim 11, wherein the computer is further operable to extract elemental gamma ratios from the inelastic spectrum measurements.

* * * * *